(12) United States Patent
Tzavidas et al.

(10) Patent No.: US 8,996,018 B2
(45) Date of Patent: Mar. 31, 2015

(54) METHOD AND APPARATUS TO FACILITATE AVOIDING CONTROL SIGNALING CONFLICTS WHEN USING SHARED WIRELESS CARRIER RESOURCES

(75) Inventors: Stavros Tzavidas, Evanston, IL (US); Guang Han, Arlington Heights, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 821 days.

(21) Appl. No.: 12/261,483

(22) Filed: Oct. 30, 2008

(65) Prior Publication Data

US 2010/0113040 A1 May 6, 2010

(51) Int. Cl.
H04W 72/00 (2009.01)
H04W 72/04 (2009.01)
H04W 16/14 (2009.01)

(52) U.S. Cl.
CPC .......... *H04W 72/0406* (2013.01); *H04W 72/04* (2013.01); *H04W 16/14* (2013.01)
USPC ............................ 455/450; 455/509; 370/329

(58) Field of Classification Search
CPC ... H04L 47/70; H04L 12/5695; H04W 28/26; H04W 84/045; H04W 72/082
USPC ................................ 455/63.1, 450
See application file for complete search history.

(56) References Cited

U.S. PATENT DOCUMENTS

| 5,497,503 | A | 3/1996 | Rydberg et al. |
| 5,732,073 | A | 3/1998 | Kusaki et al. |
| 6,400,704 | B2 | 6/2002 | Mikuni et al. |
| 6,553,231 | B1 | 4/2003 | Karlsson et al. |
| 6,744,740 | B2 | 6/2004 | Chen |
| 6,771,968 | B1 | 8/2004 | Heubel |
| 7,107,012 | B2 | 9/2006 | Kashiwagi et al. |
| 7,352,690 | B2 | 4/2008 | Geile et al. |
| 7,352,779 | B2 | 4/2008 | Geile et al. |
| 7,355,963 | B2 | 4/2008 | Geile et al. |

(Continued)

FOREIGN PATENT DOCUMENTS

| EP | 1248479 | 10/2002 |
| EP | 1843618 | 10/2007 |

(Continued)

OTHER PUBLICATIONS

3GPP TSG-RAN WG4 Meeting #44, "Spectrum Arrangement to enable Co-channel deployment of Home NodeBs", Athens, Greece, Aug. 20-24, 2007, R4-0701494, all pages.

(Continued)

*Primary Examiner* — Gerald Johnson
(74) *Attorney, Agent, or Firm* — Faegre Baker Daniels LLP

(57) ABSTRACT

A base station (500) can determine (201) which resource blocks a second base station (503) will utilize to transmit control signaling as corresponds to that second base station. The base station can then prevent (202) itself from transmitting control signaling (which control signaling corresponds to a plurality of wireless carrier resources as correspond to the base station) using resource blocks that will coincide with the resource blocks the second base station will utilize to transmit its control signaling. These teachings also provide for having the base station then transmit (203) a signal that comprises an indication that the control signaling as corresponds to the plurality of wireless carrier resources will be transmitted using the alternative resource blocks as compared to at least one ordinarily expected resource block.

20 Claims, 3 Drawing Sheets

(56) References Cited

U.S. PATENT DOCUMENTS

| | | | |
|---|---|---|---|
| 7,355,964 | B2 | 4/2008 | Geile et al. |
| 7,366,128 | B2 | 4/2008 | Hundal et al. |
| 7,391,712 | B2 | 6/2008 | Geile et al. |
| 7,391,753 | B2 | 6/2008 | Tiedemann, Jr. et al. |
| 7,392,015 | B1 | 6/2008 | Farlow et al. |
| 7,392,018 | B1 | 6/2008 | Ebert et al. |
| 7,558,577 | B2 | 7/2009 | Dillon et al. |
| 7,917,149 | B2 * | 3/2011 | Chen et al. ............ 455/450 |
| 8,027,393 | B2 | 9/2011 | Hui et al. |
| 2001/0016499 | A1 | 8/2001 | Hamabe |
| 2001/0027103 | A1 | 10/2001 | Willingham et al. |
| 2003/0117966 | A1 | 6/2003 | Chen |
| 2004/0092281 | A1 | 5/2004 | Burchfiel |
| 2004/0125768 | A1 | 7/2004 | Yoon |
| 2004/0192325 | A1 | 9/2004 | Backes et al. |
| 2004/0203828 | A1 | 10/2004 | Mirchandani et al. |
| 2005/0032537 | A1 | 2/2005 | Miyashita |
| 2005/0130662 | A1 | 6/2005 | Murai |
| 2005/0249322 | A1 | 11/2005 | Gerlach |
| 2006/0262750 | A1 * | 11/2006 | Walton et al. ............ 370/329 |
| 2007/0004423 | A1 | 1/2007 | Gerlach et al. |
| 2007/0081449 | A1 | 4/2007 | Khan |
| 2007/0087740 | A1 | 4/2007 | Petersen |
| 2007/0147287 | A1 | 6/2007 | Jalil et al. |
| 2007/0207737 | A1 | 9/2007 | Hui et al. |
| 2007/0223419 | A1 | 9/2007 | Ji et al. |
| 2007/0287464 | A1 | 12/2007 | Hamamoto et al. |
| 2008/0081626 | A1 | 4/2008 | Choi et al. |
| 2008/0311942 | A1 * | 12/2008 | Kim et al. ............ 455/509 |
| 2009/0040972 | A1 * | 2/2009 | Robson et al. ............ 370/329 |
| 2009/0197588 | A1 | 8/2009 | Khandekar et al. |
| 2009/0268684 | A1 | 10/2009 | Lott et al. |

FOREIGN PATENT DOCUMENTS

| | | |
|---|---|---|
| JP | 07-162948 A | 6/1995 |
| WO | 02091597 | 11/2002 |
| WO | 02091597 A2 | 11/2002 |
| WO | WO 2005/015917 A2 | 2/2005 |
| WO | WO 2007/050018 A1 | 5/2007 |
| WO | WO 2007/126351 A1 | 11/2007 |
| WO | 2008088253 A1 | 7/2008 |
| WO | WO 2008155732 A2 * | 12/2008 ............ H04W 16/10 |

OTHER PUBLICATIONS

3GPP TSG-RAN Working Group 4 (Radio) meeting #46, R4-080409, Sorrento, Italy, Feb. 11-15, 2008, all pages.

3GPP TS 36.3000, v8.7.0 (Dec. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), all pages.

3GPP TR 25.820 v8.2.0 (Sep. 2008), 3rd Generation Partnership Project; Technical Specification Group Radio Access Networks; 3G Home NodeB Study Item Technical Report (Release 8), all pages.

3GPP TS 36.304, v8.4.0 (Dec. 2008), 3rd Generation Partnership Project; Technical Specification Group Radio Access Network; Evolved Universal Terrestrial Radio Access (E-UTRA); User Equipment (UE) procedures in idle mode (Release 8), all pages.

Gab-Yeon Kang, "Corresponding Application PCT/US2009/059488—PCT International Search Report and Written Opinion," WIPO, ISA/KR, Korean Intellectual Property Office, Daejeon, Republic of Korea, May 18, 2010, 11 pages, most relevant pp. 6-7 aand 10-11.

The State Intellectual Property Office of the People'S Republic of China, Notification of the First Office Action, Jun. 25, 2013, all pages.

KIPO's Notice of Preliminary Rejection (English Translation), Apr. 29, 2013, all pages.

United States Patent and Trademark Office, "Non-Final Rejection" for U.S. Appl. No. 12/540,414 (CE18288) dated Jul. 3, 2013, 10 pages.

Supplementary European Search Report in counterpart EP Application No. 09840569.9, dated May 8, 2014, 10 pages.

United States Patent and Trademark Office, "Non-Final Rejection" for U.S. Appl. No. 12/540,414 dated Aug. 13, 2014, 10 pages.

State Intellectual Property Office of the People'S Republic of China, Notification of the Third Office Action for Chinese Patent Application No. 200980142701.6 (related to above-captioned patent application), mailed Nov. 14, 2014 (16 pages).

United States Patent and Trademark Office, "Notice of Allowance and Fee(s) Due" for U.S. Appl. No. 12/540,414 dated Dec. 19, 2014, 9 pages.

* cited by examiner

METHOD AND APPARATUS TO FACILITATE AVOIDING CONTROL SIGNALING CONFLICTS WHEN USING SHARED WIRELESS CARRIER RESOURCES

TECHNICAL FIELD

This invention relates generally to wireless communications and more particularly to the use of allocatable shared wireless carrier resources.

BACKGROUND

Wireless communication systems of various kinds are known including systems that share, to one extent or another, one or more wireless carrier resources. The latter can comprise, for example, carrier frequencies (including, in some cases, sub-carriers that are borne by such carrier frequencies), time-partitioned resources, spreading code-partitioned resources, and so forth. In many cases involving shared wireless carrier resources, it is incumbent upon at least one of the sharing systems to have a more subservient and secondary role with respect to the use of such resources. By one approach, for example, this can comprise having the more subservient system avoid using wireless carrier resources that are being used by the more dominant system.

As one salient example in these regards, there are proposed local-area systems (such as a residentially-based system) that are permitted to use wireless carrier resources as are also available for use by a wide-area system (such as a cellular telephony-based system) so long as the local-area system's use of such resources does not interfere with any wide-area system end users. In at least some such cases, the control signaling format and structure as used by both the local-area systems and the wide-area system will be essentially (or even identically) the same. This can comprise, for example, both employing a frame structure that includes a preamble section that is followed immediately by a MAP section that sets forth present sub-carrier assignments.

Such an approach can lead to beneficial re-use of end-user platform functionality and behavior. On the other hand, such an approach can also lead to serious conflicts and service disruptions. For example, as both systems in such an application setting are employing a same control-signaling format, the transmission of the wide-area system's MAP will typically conflict with the transmission of the local-area system's MAP information. As such control signaling is usually transmitted across all available sub-carriers of the shared wireless carrier resource(s), this can result in the local-area system having no room to transmit its control signaling and this, in turn, can effectively lead to an inability of the local-area system to actually share the wireless carrier resources in any practical and meaningful manner with the wide-area system.

BRIEF DESCRIPTION OF THE DRAWINGS

The above needs are at least partially met through provision of the method and apparatus to facilitate avoiding control signaling conflicts when using shared wireless carrier resources described in the following detailed description, particularly when studied in conjunction with the drawings, wherein.

Figure 1:
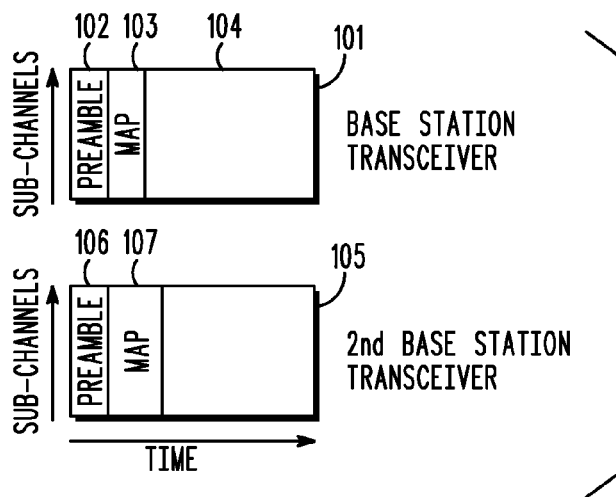
FIG. 1 comprises a schematic view as configured in accordance with prior art practice.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a base station can determine the resource blocks that a second base station will utilize to transmit control signaling as corresponds to that second base station. The base station can then prevent itself from transmitting control signaling (which control signaling corresponds to a plurality of wireless carrier resources as correspond to the base station) using resource blocks that will coincide with the resource blocks that the second base station will use to transmit its control signaling. These teachings also provide for having the base station then transmit a signal that comprises an indication that the control signaling as corresponds to the plurality of wireless carrier resources will be transmitted using at least one alternative resource block as compared to the ordinarily expected resource blocks.

By one approach, these ordinarily expected resource blocks can be determined with respect to a transmission of a protected identification channel. In such a case, these teachings will also accommodate transmitting the aforementioned indication in and during this protected identification channel. By one approach, and without intending any limitations in this regard, this protected identification channel can comprise a frame preamble that is transmitted across all sub-carriers as are borne by a given shared wireless carrier resource (or resources).

Those skilled in the art will appreciate that these teachings are readily applied in both a time division multiplexed (TDM) application setting and a frequency division multiplexed (FDM) application setting. It will be further appreciated that these teachings are equally applicable in application settings where the aforementioned base stations transmit in synchronicity with one another and also in application settings where such synchronicity is not required.

So configured, these teachings permit a base station, such as a local-area base station, to transmit its control signaling (such as, but not limited to, its MAP information) in a manner that protects the sanctity of a wide-area base station's control signaling transmissions while also assuring that the end users of the local-area base station are nevertheless still able to receive the control signaling information they need in order to make timely and effective use of the local-area base station's resources.

It will be further recognized and appreciated that these teachings are readily implemented in a variety of application settings and typically without requiring the protected base station to engage in any new or supplemental activity or functionality. Those skilled in the art will also recognize that these teachings are highly scalable and can be applied in a wide variety of application settings in conjunction with any of a wide variety of wireless carrier resources, control signaling paradigms, and so forth.

These and other benefits may become clearer upon making a thorough review and study of the following detailed description. Referring now to the drawings, and in particular to FIG. 1, it may be helpful to first describe a particular application setting that can serve as a useful base for illustrating various aspects of these teachings. Those skilled in the art will recognize and understand that this application setting is intended to serve only in an illustrative capacity and is not intended to comprise an exhaustive listing of all possibilities in this regard. In fact, it is anticipated that those skilled in the art will readily note and easily identify any number of other application settings that can readily accommodate these teachings and benefit therefrom.

In this illustrative application setting, the aforementioned base station can comprise a transceiver that uses at least a first wireless carrier resource represented here by a carrier frequency. This carrier frequency is subdivided over time into corresponding frames 101 (having a duration, for example, of five milliseconds though other lengths (both shorter and longer) are of course possible and available) and/or is subdivided by frequency into sub-carriers.

Each such frame 101 begins with a protected identification channel comprising a preamble 102 that occupies all of the sub-carriers that comprise the carrier frequency. This portion of the frame 101 is considered "protected" due to the employment of some one or more techniques for protecting this portion of the frame 101 from interference from other base stations. This protection can take the form, for example, of orthogonal identification codes such as but not limited to spreading codes, LTE identification codes, particular preamble patterns/codes, and the like.

Each such frame 101 also includes a MAP portion 103 that immediately follows conclusion of the preamble 102. In accordance with prior art practice in this regard, this MAP portion 103 can vary in length depending upon the volume of sub-carrier assignments that are being accommodated in a given frame 101. A remaining portion 104 of the frame 101 is then available for end user content. In this illustrative example, this MAP portion 103 utilizes all available sub-carriers. Those skilled in the art will recognize that such a configuration is not a requirement for all systems.

A second base station that also comprises a transceiver also shares use of this same wireless carrier resource. This second base station also shares the same signaling format described above for the base station. As a result, this second base station transceiver also employs frames 105 that begin with a preamble 106 and a MAP portion 107 that immediately follows the preamble 106 and which also utilizes all available sub-carriers.

In this illustrative application setting, the transmissions of both base station transceivers are synchronized in time. As a direct result of this configuration, the frames 101 and 105 of both transceivers begin at essentially identical times. This, in turn, leads to the aforementioned problem where the MAP portion 107 transmissions of the second base station 105 can be interfered with by the MAP portion 103 transmissions of the base station. When the base station comprises a local-area system and the second base station comprises a part of a wide-area system, such a result constitutes impermissible interference.

Figure 2:
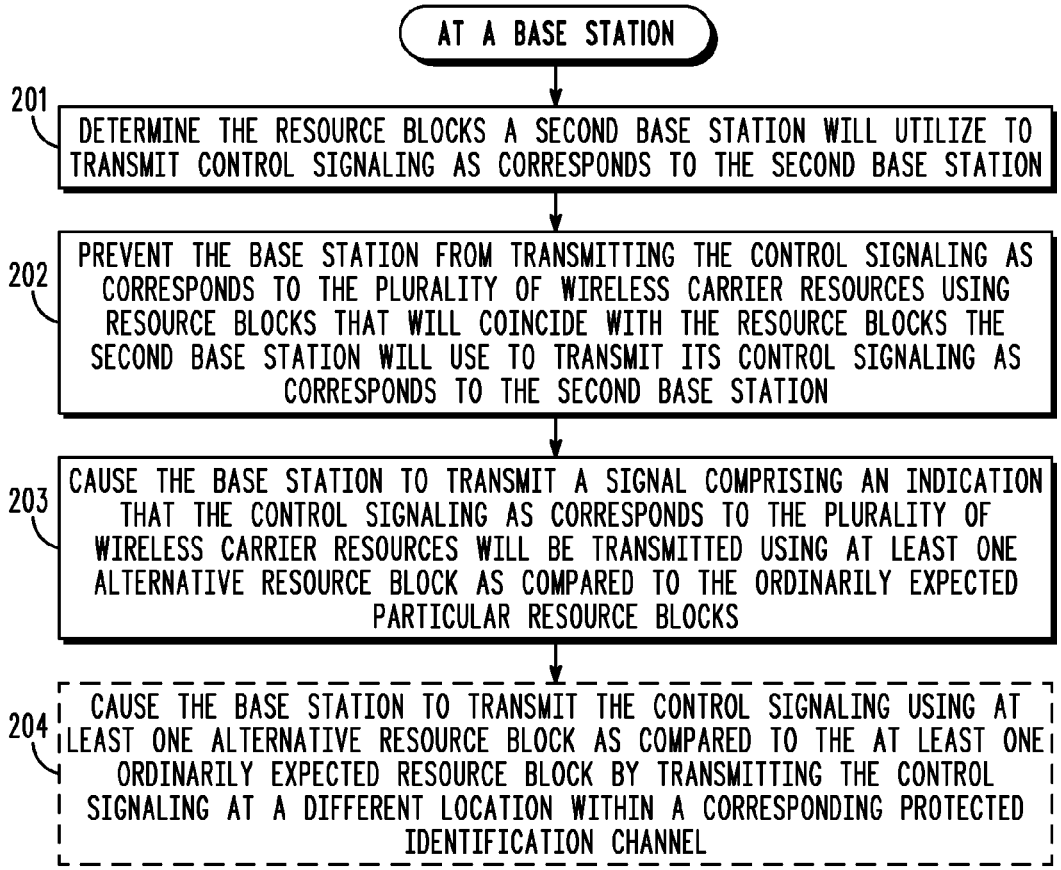
FIG. 2 comprises a flow diagram as configured in accordance with various embodiments of the invention.

Referring now to FIG. 2, an illustrative process 200 that is compatible with many of these teachings will now be presented. This process 200 is presumably being carried out, in this illustrative example, by a corresponding base station and, in particular, by a base station that shares at least some wireless carrier resources with a second base station and where the base station must avoid interfering with the second base station's use of those wireless carrier resources. It will be understood that the nature of these wireless carrier resources can vary with the application setting. In some cases, for example, these wireless carrier resources can comprise time-based resources and/or resources that are differentiated via the use of sub-carriers, a spreading technology, or other methodology of choice. In other cases, these wireless carrier resources can comprise a plurality of different carrier frequencies. In yet other cases all of these approaches can be employed to one extent or another.

As used herein, the expression "resource block" will be understood to refer to a portion of a wireless carrier resource that is bounded by time and/or sub-carriers and hence can comprise, for example, a single sub-carrier for a particular duration of time, a plurality of sub-carriers for a given duration of time, or any combination thereof. For the sake of simplicity and clarity, the following primary description presumes that the resource block will comprise all available sub-carriers over some given period of time. Those skilled in the art will understand that this presumption is intended only for illustrative purposes and is not intended to suggest any limitations in these regards.

This process 200 includes the step 201 of determining the resource blocks the second base station will utilize to transmit control signaling as corresponds to the second base station. In this illustrative example, this will comprise determining when the second base station will transmit this control signaling. The content, extent, and quantity of this control signaling will of course vary with the application setting. For the sake of illustration and not by way of limitation, this described example will presume this control signaling to comprise, at the least, MAP information that correlates specific sub-carriers of one or more frequency carriers with corresponding end users of the second base station's resources.

The precise mechanism for making this determination will also vary with the application setting. In some cases, this determination can be based upon information that the base station already possesses. In other cases, this determination may be based, in whole or in part, upon information that the base station has only recently acquired. Again for the sake of example and not by way of limitation, this described example will presume that this determination comprises, at least in part, determining when the second base station will itself transmit a protected identification channel. This protected identification channel can comprise, for example, a frame preamble such as the preambles described above with respect to FIG. 1.

The present illustrative example will also presume that the second base station's control signaling is always transmitted immediately upon the conclusion of this preamble. As this preamble has a known duration, the conclusion of the preamble (and hence the beginning of the control signaling) is known to the base station hence enabling this determination step 201.

This process 200 then provides the step 202 of preventing the base station from transmitting its control signaling as corresponds to the plurality of wireless carrier resources (such as, but not limited to, its own MAP information) that are used by the base station using resource blocks that will coincide with the resource blocks the second base station will be using to transmit its control signaling as corresponds to the second base station. In this illustrative example, this will comprise preventing the base station from transmitting its control signaling at a time that will overlap with the second base station's transmission in this regard. Moreover, the base station will not schedule any other transmission using the resource blocks the second base station will be using to transmit its control signaling as corresponds to the second base station. As noted above, the start time for the second base station's transmission of its control signaling is known. The conclusion of that transmission can also be known in various ways depending again upon the specifics of the application setting. For example, in some cases the duration of the control signaling will be fixed. In other cases the duration may vary but will never exceed some given known duration. In yet other cases the duration of the control signaling portion of the frame may be specified by the second base station in some previous transmission.

In another related step 203, this process 200 causes the base station to transmit a signal that comprises an indication that the control signaling as corresponds to the plurality of wireless carrier resources as correspond to the base station will be transmitted using at least one alternative resource block as compared to at least one ordinarily expected resource block. In this illustrative example, this would comprise causing the base station to transmit a signal that comprises an indication that the control signaling will be transmitted following a specifically delayed time as compared to an ordinarily expected time. By one approach, for example, this ordinarily expected time can again be determined with respect to a transmission of a protected identification channel. To illustrate, and as was described above for the second base station, the ordinarily expected time for the base station to provide the control signaling can be immediately following the conclusion of the transmission of the protected identification channel.

By one approach, the aforementioned indication can be transmitted by the base station during the aforementioned protected identification channel. For example, when the protected identification channel comprises a frame preamble, this indication can be transmitted during and as a part of that preamble. In such a case, these teachings will accommodate providing this indication in the same frame as will contain the delayed transmission of the control signaling itself.

The form of the indication itself can also vary with respect to the specifics of the application setting itself. In some settings, for example, this indication can comprise, at least in part, a particularly selected protected identification sequence (or a particularly selected subset of protected identification channel content patterns) such as a particular pattern or coded presentation of the preamble contents.

As another example, this indication can make use of the spreading codes that may be available to the base station. For example, the base station can employ one spreading code (or any of a particular group of spreading codes) when transmitting in accordance with the ordinary expected time of transmitting its control signaling and another, different spreading code (or any of a different group of spreading codes) when delaying the transmission of the control signaling as per these teachings.

As yet another example, the base station and its end users pre-agree on multiple alternative selections of resource blocks to transmit its control signaling, thus no indication through the protected identification channel is needed. (As used herein, this notion of "pre-agreeing" will be understood to refer to an arrangement that has been arranged prior to a time of any actual need for the results of the agreement and hence does not include, for example, an agreement that occurs on-the-fly and immediately prior to the need for such an arrangement.)

As yet another specific example in this regard, this identification can comprise a Third Generation Partnership Project (3GPP) Long Term Evolution (LTE)-compatible identification code.

As one might expect, this process 200 will also optionally accommodate the step 204 of causing the base station to then transmit its control signaling using the at least one alternative resource block as compared to at least one ordinarily expected resource block. In this illustrative example, this can comprise causing the base station to transmit its control signal following the specifically delayed time as compared to the ordinarily expected time. This can comprise, by one approach, transmitting the control signaling at a different location within a corresponding protected identification channel.

Figure 3:
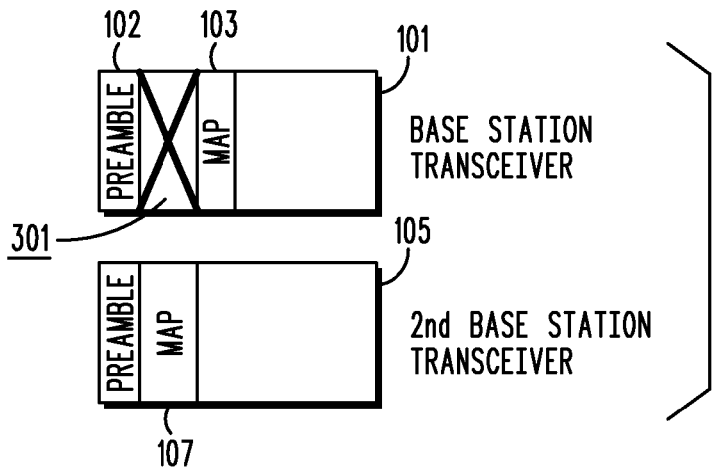
FIG. 3 comprises a schematic view as configured in accordance with various embodiments of the invention.

Referring now to FIG. 3, an illustrative example in these regards as corresponds to an application setting that employs time division multiplexing will be described. In this example, the second base station transceiver will transmit its MAP information at the conclusion of transmitting its preamble 106. The base station transceiver, being aware of these conditions and acting in accordance with the foregoing, transmits an indication in its preamble 102 in indicate that its own MAP information 103 is not going to be transmitted at its ordinarily expected time (i.e., at the conclusion of its own preamble 102) but rather following a given delay 301. The base station transceiver then transmits that MAP information 103 at the conclusion of that delay 301.

So configured, it can be readily appreciated that the MAP transmissions of the second base station transceiver are fully protected from the transmissions of the base station transceiver (especially when the latter is silent during this interval 301 and offers no competing transmissions whatsoever as indicated by the "X" in FIG. 3). The end users of the base station transceiver, however, are still able to obtain the MAP information for the base station transceiver, albeit at a slightly delayed time.

Figure 4:
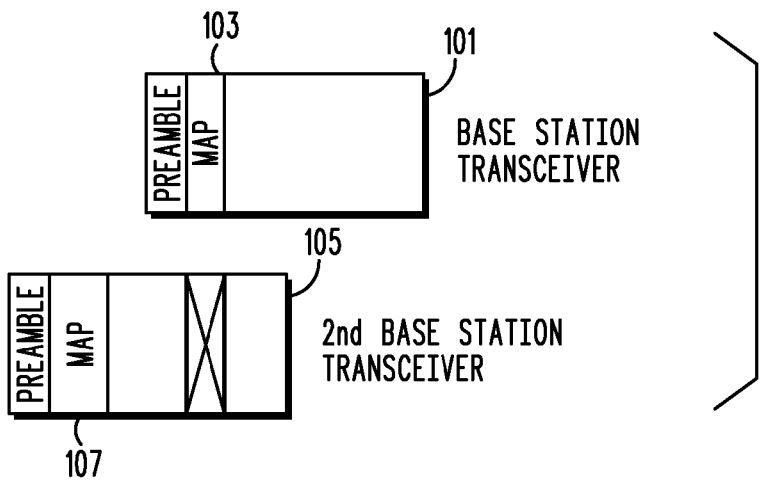
FIG. 4 comprises a schematic view as configured in accordance with various embodiments of the invention.

Referring now to FIG. 4, an illustrative example in these regards as corresponds to an application setting that employs frequency division multiplexing will be described. In particular, in this application setting, the transmissions of the two base station transceivers are not necessarily synchronized in time with respect to one another. In this example, the second base station transceiver again transmits its MAP information at the conclusion of transmitting its preamble 106. Here, however, the base station transceiver is able to avoid interfering with the second base station MAP transmission by time shifting its frame and halting its transmission using the resource blocks that the second base station will be using to transmit its MAP. In this case, the base station transceiver's frame is able to observe the ordinarily expected time to transmit the MAP information.

Figure 5:
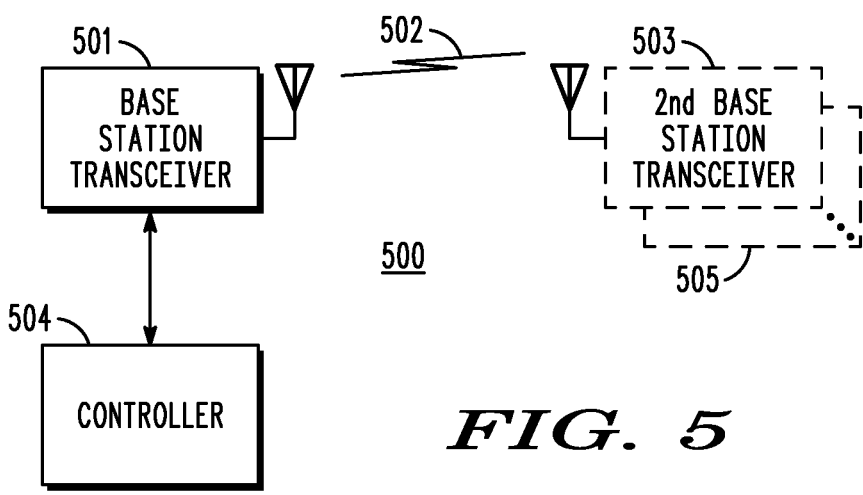
FIG. 5 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 5, an illustrative approach to such a platform will now be provided.

This apparatus can comprise a base station 500 having a base station transceiver 501 that is configured to selectively allocate any of a plurality of wireless carrier resources 502 (wherein at least some of those wireless carrier resources are shared with a second base station 503 (or base stations 505) and where this base station transceiver 501 is ordinarily expected to transmit control signaling as corresponds to this plurality of wireless carrier resources at a particular time. Various base station transceivers are known in the art in this regard. As these teachings are not overly sensitive to any particular selection in this regard, for the sake of brevity and the preservation of clarity, further elaboration in this regard will not be presented here.

This base station 500 also comprises a controller 504 that operably couples to the base station transceiver 501. Those skilled in the art will recognize and appreciate that such a controller 504 can comprise a fixed-purpose hard-wired platform or can comprise a partially or wholly programmable platform. All of these architectural options are well known and understood in the art and require no further description here. This controller 504 is configured (via, for example, corresponding programming as will be well understood by those skilled in the art) to carry out one or more of the steps, actions, or elements of functionality that are described herein. This can include specifically, as desired, determining the resource blocks that the second base station 503 will utilize to transmit its own control signaling, preventing the base station transceiver 501 from transmitting the base station's 500 own control signaling as pertains to the plurality of wireless carrier resources 502 using resource blocks that will coincide with the resource blocks being used by the second base station transceiver 503 to transmit the second base station's control signaling, and causing the base station transceiver 501 to transmit a signal that comprises an indication that the base station's 500 control signaling will be transmitted using at least one alternative resource block as compared to the ordinarily expected resource blocks.

Those skilled in the art will recognize and understand that such an apparatus 500 may be comprised of a plurality of physically distinct elements as is suggested by the illustration shown in FIG. 5. It is also possible, however, to view this illustration as comprising a logical view, in which case one or more of these elements can be enabled and realized via a shared platform. It will also be understood that such a shared platform may comprise a wholly or at least partially programmable platform as are known in the art.

Figure 6:
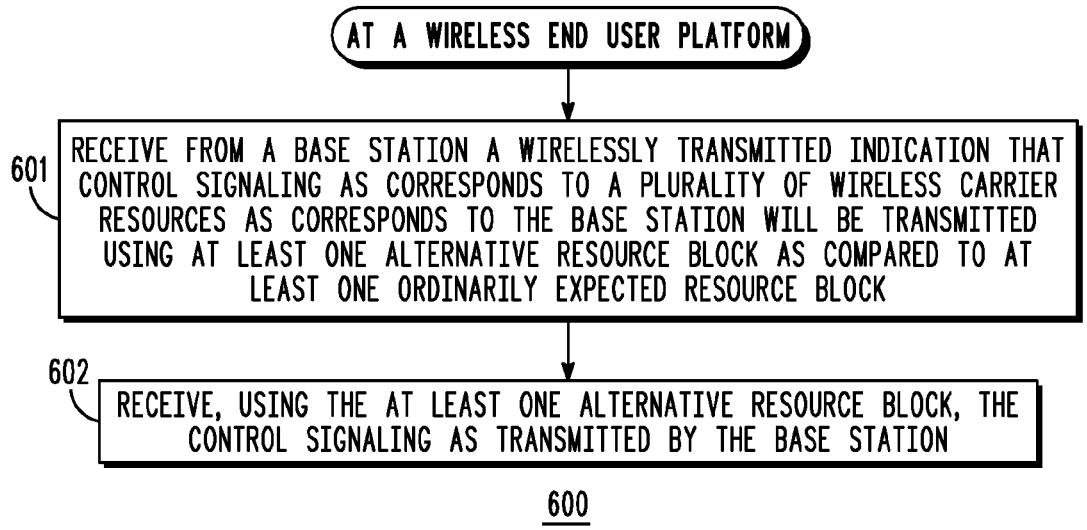
FIG. 6 comprises a flow diagram as configured in accordance with various embodiments of the invention.

As described, these teachings provide for the transmission of an indication that a given base station's controlling signaling (as corresponds to its wireless carrier resources) will be delayed a specific amount of time beyond an ordinarily expected time. Referring now to FIG. 6, a corresponding process 600 for a wireless end-user platform will be described.

This process 600 provides the step 601 of receiving from such a base station a wirelessly transmitted indication that control signaling as corresponds to the base station's plurality of wireless carrier resources will be transmitted using at least one alternative resource block as compared to at least one ordinarily expected resource block. By one approach, for example, this can comprise receiving this indication as part of a protected identification channel. This process 600 then provides the step 602 of receiving, using the at least one alternative resource block, the control signaling as transmitted by the base station.

So configured, the wireless end-user platform will be able to receive, with assurance, the control signaling information that it may require in order to compatibly receive the transmissions of the base station.

So configured, those skilled in the art will recognize and appreciate that these teachings permit a given base station that plays a subservient roll with respect to its usage of one or more shared wireless carrier resources to make effective use of its sharing opportunities without any impact upon or detriment to another base station or system having superior rights to the usage of those shared resources.

Figure 7:
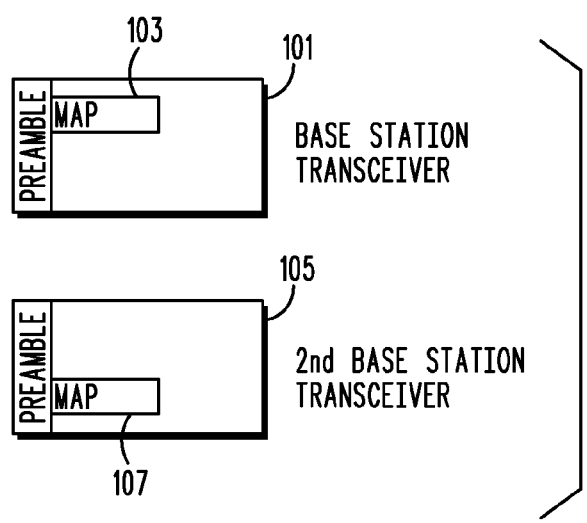
FIG. 7 comprises a schematic view as configured in accordance with various embodiments of the invention.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one example in these regards, and referring now to FIG. 7, when the resource blocks being utilized by the second base station to transmit its MAP information 103 comprise a particular sub-carrier, the base station can utilize the foregoing teachings to avoid transmitting its own MAP information 107 using that same sub-carrier and to itself use a different sub-carrier when transmitting that information. In such an application setting the MAP information transmission may overlap in time but interference is nevertheless avoided due to the use of differing sub-carriers.

We claim:

1. An apparatus comprising:
a base station comprising:
a base station transceiver configured to selectively allocate any of a plurality of wireless carrier resources, wherein at least some of the plurality of wireless carrier resources are shared with a second base station transceiver and wherein the base station transceiver is expected to transmit control signaling over the plurality of wireless carrier resources using particular resource blocks; and
a controller operably coupled to the base station transceiver, wherein the controller is configured to:
determine which resource blocks the second base station transceiver will utilize to transmit control signaling;
prevent the base station transceiver from transmitting the control signaling over the plurality of wireless carrier resources using resource blocks that will coincide with the resource blocks the second base station transceiver will use to transmit its control signaling;
cause the base station transceiver to transmit a signal comprising an indication that the control signaling will be transmitted using alternative resource blocks as compared to the particular resource blocks.

2. The apparatus of claim 1 wherein the particular resource blocks that the base station transceiver is expected to utilize to transmit the control signaling are determined with respect to a transmission of a protected identification channel.

3. The apparatus of claim 2 wherein the controller is configured to cause the base station transceiver to transmit a signal comprising an indication that the control signaling will be transmitted using alternative resource blocks as compared to the particular resource blocks by transmitting the indication in the protected identification channel.

4. The apparatus of claim 3 wherein the indication comprises, at least in part, at least one of:
 a particularly selected protected identification sequence;
 a particularly selected subset of protected identification channel content patterns.

5. The apparatus of claim 1 wherein the particular resource blocks that the base station transceiver is expected to utilize to transmit the control signaling are pre-agreed between the base station and its end users.

6. The apparatus of claim 5 wherein pre-agreed particular resource blocks comprise multiple alternative selections of resource blocks that are used to transmit the control signaling.

7. The apparatus of claim 1 wherein the base station transceiver is further configured to adjust its frame timing with respect to that of the second base station transceiver to avoid transmitting the control signaling using resource blocks that will coincide with the resource blocks the second base station transceiver will use to transmit its control signaling.

8. The apparatus of claim 1 wherein the base station transceiver does not schedule any transmission using the resource blocks that the second base station transceiver will use to transmit its control signaling.

9. A method comprising:
 at a base station:
  determining resource blocks a second base station will utilize to transmit the second base station's control signaling;
  preventing, by the base station, the base station from transmitting the base station's control signaling over a plurality of wireless carrier resources using resource blocks that will coincide with resource blocks the second base station will utilize to transmit its control signaling;
  causing the base station to transmit a signal comprising an indication that the control signaling will be transmitted using alternative resource blocks as compared to expected resource blocks.

10. The method of claim 9 wherein at least one of the alternative resource blocks is determined with respect to a transmission of a protected identification channel.

11. The method of claim 10 wherein causing the base station to transmit a signal comprising an indication that the base station's control signaling will be transmitted using alternative resource blocks as compared to expected resource blocks comprises transmitting the indication in the protected identification channel.

12. The method of claim 11 wherein the indication comprises, at least in part, at least one of:
 a particularly selected protected identification sequence;
 a particularly selected subset of protected identification channel content patterns.

13. The method of claim 9 wherein the particular resource blocks that the base station is expected to utilize to transmit the base station's control signaling over the plurality of wireless carrier resources are pre-agreed between the base station and its end users.

14. The method of claim 13 wherein the base station and its end users pre-agree on multiple alternative selections of resource blocks that are used to transmit the control signaling.

15. The method of claim 9 wherein the base station adjusts its frame timing with respect to that of the second base station to avoid transmitting the control signaling over the plurality of wireless carrier resources using resource blocks that will coincide with the resource blocks the second base station will use to transmit its control signaling.

16. The method of claim 9 wherein the base station does not schedule any transmission using the resource blocks that the second base station will use to transmit its control signaling.

17. A method comprising:
 at a wireless end user platform:
  receiving from a base station a wirelessly transmitted indication that control signaling will be transmitted over a plurality of wireless carrier resources using alternative resource blocks as compared to expected resource blocks;
  receiving, using alternative resource blocks, the control signaling after the base station has prevented itself from transmitting the control signaling over the plurality of wireless carrier resources using the expected resource blocks.

18. The method of claim 17 wherein receiving from a base station a wirelessly transmitted indication comprises receiving a protected identification channel that includes the indication.

19. The method of claim 17 wherein receiving the control signaling from a base station comprises using pre-agreed resource blocks.

20. The method of claim 19 wherein the wireless end user platform searches every alternative selection of the pre-agreed resource blocks to locate the control signaling from the base station.

* * * * *